(12) United States Patent
Yan et al.

(10) Patent No.: US 12,341,611 B2
(45) Date of Patent: Jun. 24, 2025

(54) METHOD AND APPARATUS FOR TRANSMISSION OF TRANSPORT BLOCKS

(71) Applicant: LENOVO (BEIJING) LIMITED, Beijing (CN)

(72) Inventors: Zhi Yan, Beijing (CN); Haipeng Lei, Beijing (CN); Hongmei Liu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 713 days.

(21) Appl. No.: 17/280,398

(22) PCT Filed: Sep. 26, 2018

(86) PCT No.: PCT/CN2018/107707
§ 371 (c)(1),
(2) Date: Mar. 26, 2021

(87) PCT Pub. No.: WO2020/061842
PCT Pub. Date: Apr. 2, 2020

(65) Prior Publication Data
US 2022/0038208 A1    Feb. 3, 2022

(51) Int. Cl.
*H04L 1/08*    (2006.01)
*H04L 1/1607*    (2023.01)
(Continued)

(52) U.S. Cl.
CPC ............. *H04L 1/08* (2013.01); *H04L 1/1614* (2013.01); *H04L 1/1642* (2013.01);
(Continued)

(58) Field of Classification Search
CPC ....... H04L 1/08; H04L 1/1614; H04L 1/1642; H04W 72/0446; H04W 72/0466; H04W 72/23
See application file for complete search history.

(56) References Cited

U.S. PATENT DOCUMENTS 11,012,999 B2 * 5/2021 Huang .................. H04L 5/0053
2017/0222749 A1 * 8/2017 Dinan .................. H04L 5/0051
(Continued)

FOREIGN PATENT DOCUMENTS

CN    107135046 A    9/2017
WO    2017213421 A1    12/2017

OTHER PUBLICATIONS

Qualcomm Incorporated, Scheduling of multiple DL/UL transport blocks, 3GPP TSG RAN WG1 Meeting #94, R1-1809024, Aug. 20-24, 2018, pp. 1-7, Gothenburg, Sweden.
(Continued)

*Primary Examiner* — Harry H Kim
(74) *Attorney, Agent, or Firm* — Kunzler Bean & Adamson (57) ABSTRACT

Method and apparatus for data transmission are disclosed. One method includes determining a redundancy version (RV) index for a first number of transport blocks (TBs), the RV index applied to at least one of the first number of TBs lasts for a third number of a first type of consecutive subframes; determining a scrambling sequence, the scrambling sequence applied to at least one of the first number of TBs lasts for a fourth number of a second type of consecutive subframe; and sending or receiving the first number of TBs according to the RV index, the scrambling sequence and a transmission order.

18 Claims, 7 Drawing Sheets

| SF-BitMap | 1 | 1 | 1 | 0 | 1 | 1 | 1 | 0 | 1 | 1 | 1 | 1 | 0 | 1 | 1 | 1 | 0 | 1 | 1 | 1 | 1 | 0 | 1 | 1 | 1 | 0 | 1 | 1 |
|---|---|---|---|---|---|---|---|---|---|---|---|---|---|---|---|---|---|---|---|---|---|---|---|---|---|---|---|---|
| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| MPDCCH | GR | | | | | | | | | | | | | | | | | | | | | | | | | | | | | |
| PUSCH-Data | | | | | TB1 | TB2 | TB3 | | TB1 | TB2 | TB3 | TB4 | TB1 | | TB3 | TB4 | TB1 | | TB3 | TB4 | TB1 | TB2 | TB3 | | | | | | | |
| RV | | | | | 0 | 0 | 0 | | 2 | 2 | 2 | 2 | 3 | | 3 | 3 | 1 | | 1 | 1 | 0 | 0 | 0 | | | | | | | |

|← n+4 →|

TB4(RV0 applied to) is missing
TB2(RV3 applied to) is missing
TB2(RV1 applied to) is missing (51) Int. Cl.
    *H04W 72/044*     (2023.01)
    *H04W 72/0446*     (2023.01)
    *H04W 72/23*     (2023.01)

(52) U.S. Cl.
    CPC ............... *H04W 72/0446* (2013.01); *H04W 72/0466* (2013.01); *H04W 72/23* (2023.01)

(56) References Cited

U.S. PATENT DOCUMENTS

| | | | |
|---|---|---|---|
| 2017/0290008 A1* | 10/2017 | Tooher | H04W 72/23 |
| 2018/0109358 A1 | 4/2018 | Xing et al. | |
| 2019/0289628 A1* | 9/2019 | Xiong | H04W 52/365 |
| 2019/0327761 A1* | 10/2019 | Suzuki | H04W 28/04 |
| 2019/0363832 A1* | 11/2019 | Yang | H04W 72/0446 |
| 2020/0067667 A1* | 2/2020 | Gou | H04L 1/1887 |
| 2020/0076553 A1* | 3/2020 | Wang | H04L 5/0051 |
| 2020/0280983 A1* | 9/2020 | Huang | H04L 5/0053 |
| 2020/0344009 A1* | 10/2020 | Shao | H04W 76/11 |
| 2021/0168850 A1* | 6/2021 | Zhang | H04L 1/1614 |
| 2021/0243736 A1* | 8/2021 | Zhao | H04W 72/569 |

OTHER PUBLICATIONS

International Searching Authority, "Notification of Transmittal of the International Search Report and the Written Opinion of the International Searching Authority, or the Declaration", PCT/CN2018/107707, Sep. 28, 2018, pp. 1-6.

3GPP, 3rd Generation Partnership Project; Technical Specification Group Radio Access Network; Remaining issues on PDSCH transmission, 3GPP R1-156841, Nov. 2015, pp. 1-4.

3GPP, 3rd Generation Partnership Project; Technical Specification Group Radio Access Network; eMTC PDSCH symbol level combining for CE mode B, 3GPP R1-156945, Nov. 2015, pp. 1-4.

* cited by examiner

| SF-BitMap | 1 | 1 | 1 | 0 | 1 | 1 | 1 | 0 | 1 | 1 | 1 | 1 | 1 | 0 | 1 | 1 | 1 | 0 | 1 | 1 | 1 | 1 | 1 | 0 | 1 | 1 | 1 | 0 | 1 | 1 |
|---|---|---|---|---|---|---|---|---|---|---|---|---|---|---|---|---|---|---|---|---|---|---|---|---|---|---|---|---|---|---|
| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| MPDCCH | GR | | | | | | | | | | | | | | | | | | | | | | | | | | | | | |
| PUSCH-Data | | | | | TB1 | TB2 | TB3 | | TB1 | TB2 | TB3 | TB4 | TB1 | | TB3 | TB4 | TB1 | | TB3 | TB4 | TB1 | TB2 | TB3 | | | | | | | |
| RV | | | | | 0 | 0 | 0 | | 2 | 2 | 2 | 2 | 3 | | 3 | 3 | 1 | | 1 | 1 | 0 | 0 | 0 | | | | | | | |

|← n+4 →|

TB4(RV0 applied to) is missing   TB2(RV3 applied to) is missing   TB2(RV1 applied to) is missing

| SF-BitMap | 1 | 1 | 1 | 0 | 1 | 1 | 1 | 0 | 1 | 1 | 1 | 1 | 1 | 0 | 1 | 1 | 1 | 0 | 1 | 1 | 1 | 1 | 1 | 0 | 1 | 1 | 1 | 0 | 1 | 1 |
|---|---|---|---|---|---|---|---|---|---|---|---|---|---|---|---|---|---|---|---|---|---|---|---|---|---|---|---|---|---|---|
| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| MPDCCH | GR | | | | | | | | | | | | | | | | | | | | | | | | | | | | | |
| PUSCH-Data | | | | | TB1 | TB2 | TB3 | | TB4 | TB1 | TB2 | TB3 | TB4 | | TB1 | TB2 | TB2 | | TB4 | TB1 | TB2 | TB3 | TB4 | | TB1 | TB2 | TB3 | | TB4 | |
| RV | | | | | 0 | 0 | 0 | | 0 | 2 | 2 | 2 | 2 | | 3 | 3 | 3 | | 3 | 1 | 1 | 1 | 1 | | 0 | 0 | 0 | | 0 | |

← n+4 →

Δ Scrambling Sequence Initialization

METHOD AND APPARATUS FOR TRANSMISSION OF TRANSPORT BLOCKS

FIELD

The subject matter disclosed herein relates generally to wireless communication and more particularly relates to transmission of transport block(s).

BACKGROUND

The following abbreviations and acronyms are herewith defined, at least some of which are referred to within the following description.

Third Generation Partnership Project ("3GPP"), Cyclic redundancy check ("CRC"), Downlink Control Information ("DCI"), Downlink ("DL"), Downlink Pilot Time Slot ("DwPTS"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Information Element ("IE"), Long Term Evolution ("LTE"), LTE Advanced ("LTE-A"), Media Access Control ("MAC"), Master Information Block ("MIB"), Machine Type Communication ("MTC"), MTC physical downlink control channel ("MPDCCH"), Narrow Band Internet of Things ("NB-IoT"), Narrow Band-Physical Uplink Control Channel ("NPDCCH"), New Radio ("NR"), Physical control format indicator channel ("PCFICH"), Physical Downlink Shared Channel ("PDSCH"), Physical hybrid ARQ indicator channel ("PHICH"), Physical Uplink Control Channel ("PUCCH"), Physical Uplink Shared Channel ("PUSCH"), Quadrature Phase Shift Keyin ("QPSK"), Quadrature amplitude modulation ("QAM"), Radio Resource Control ("RRC"), Received Signal Strength Indicator ("RSSI"), Reference Signal Received Power ("RSRP"), Reference Signal Received Quality ("RSRQ"), Receive ("RX"), Radio Network Temporary Identifier ("RNTI"), Redundancy Version ("RV"), Single Cell Point to Multipoint System ("SC-PTM"), Information Block ("SIB"), Transport Block ("TB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS").

MTC is expected to play an essential role within future 5G systems. It has been identified as an important use-case for 5G NR wireless technology. Applications of this type are characterized by huge volumes of end-points and connections, using low-cost devices and modules for wireless sensor networks, connected homes, smart metering and so on. It is expected that a new network is able to handle significantly more connections efficiently, which is prompting the development of new technologies to support Bandwidth Reduced Low Complexity/Coverage Enhancement (BL/CE) UEs. eMTC defines two kinds of coverage enhancement mode (CE mode): CE mode A and CE mode B, which is indicated by higher layer signaling. CE mode A describes a set of eNB/UE behaviors without repeated transmissions or with a small number of repeated transmissions, while CE mode B describes a set of eNB/UE behaviors with a large number of repeated transmissions.

NB-IoT is a standards-based low power wide area (LPWA) technology developed to enable a wide range of new IoT devices and services. NB-IoT significantly improves the power consumption of user devices, system capacity and spectrum efficiency. More than 10 years of battery life can be supported for a wide range of use cases.

Similar with mechanism for scheduling a transport block in LTE, special DCI formats are used to schedule a DL/UL transport block for eMTC/NB-IoT UEs. For example, DCI formats 6-0A/6-0B are used to indicate UL grant for eMTC CE mode A and CE mode B UE respectively, and DCI format 6-1A/6-1B is used to indicate transmission configuration/scheduling of DL transport blocks. In another example, DCI format N0 is used to indicate UL grant for NB-IoT UE, and DCI format N1 is used to indicate the transmission configuration/scheduling of DL transport blocks.

Particularly, in the RAN 80 plenary meeting of 3GPP, new work items for Rel.16 eMTC/NB-IoT are approved. In the RAN1 94 meeting of 3GPP, for scheduling multiple TBs with single DCI, companies are encouraged to study interleaving amongst TBs from different HARQ processes in cases of repetition, when multiple TBs are scheduled by one DCI.

BRIEF SUMMARY

It is expected that each of multiple DL or UL transport blocks can be transmitted with efficiency, in the case of interleaved transmission among multiple DL/UL transport blocks with repeated transmission for each transport block. However, given that some subframes are referred to as invalid subframes for which PDSCH or PUSCH transmission is postponed, some of the multiple DL or UL transport blocks may be transmitted less repetition times than others in a given duration, which leads to different transmission delay for different TBs. In another aspect, a total duration for a repeated transmission of multiple DL or UL transport blocks is enlarged due to the existence of the invalid subframes. Thereby interleaving transmissions of multiple transport blocks should be further studied in order to provide equivalent transmission opportunities for the multiple transport blocks.

The method and apparatus for transmission of multiple transport blocks are disclosed. One method proposed for a network equipment or a UE includes determining a redundancy version (RV) index for a first number of transport blocks (TBs), where the RV index applied to at least one of the first number of TBs lasts for a third number of a first type of consecutive subframes; determining a scrambling sequence, the scrambling sequence applied to at least one of the first number of TBs lasts for a fourth number of a second type of consecutive subframe; and sending or receiving the first number of TBs according to the RV index, the scrambling sequence and a transmission order. That is, the method proposed for a network equipment or a UE determines the transmission order of the transport blocks, RV index and scrambling sequence applied to the transport blocks.

The method and apparatus disclosed herein provides equivalent transmission opportunities for the multiple transport blocks by the designed interleaving transmission of multiple transport blocks, thereby the duration transmission of the multiple transport blocks is balanced, and the decoding on the multiple transport blocks is improved.

BRIEF DESCRIPTION OF THE DRAWINGS

A more particular description of the embodiments briefly described above will be rendered by reference to specific embodiments illustrated in the appended drawings. Given that these drawings depict only some embodiments and are not therefore considered to be limiting in scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

The definition for variables is described before the explanation of the embodiments of the present application. As known to one skilled in the relevant art, a single DCI can schedule multiple TBs. In another aspect, higher layer signaling can indicate a SF-BitMap of (multiple) subframes, which indicates whether a subframe in the (multiple) subframes can be used to carry a TB or not, i.e. valid or invalid subframes. The absolute subframes includes both valid and invalid subframes. Also, in another aspect, symbol level combination can be applicable for the transmission of TB within subframes. That is, consecutive subframes are used to transmit a same TB with same RV and same scrambling sequence to the TB in the scenario of eMTC CE mode B. Thereby:

Multiple TBs are referred to as a TB set herein, including 2 TBs of {TB1, TB2} in the scenario of eMTC CE mode B and NBIoT, or including 8 TBs of {TB1, TB2, . . . , TB8} for FDD PUSCH transmission in the scenario of eMTC CE mode A.

A number of TBs in the TB set is denoted as $N_T$ and is also referred as the first number of TBs.

In one embodiment of the present application, TBs are cyclically transmitted in a period, the duration of the period is referred as a second number of subframes. In one embodiment of the present application, RV index and scrambling sequence applied to TBs are changed over time. The number of subframes in which the same RV index is applied to at least one of the first number of transport blocks is referred to as a third number of subframes. The number of subframes in which the scrambling sequence is applied at least one of the first number of transport blocks refers to as a fourth number of subframes.

A number of consecutive subframes for a same TB, which a same RV index applied to, is denoted as $N_{acc}$, and is also referred to as the fifth number of consecutive subframes for a same TB.

In one embodiment of the present application, the TBs, transmission of which is still incomplete remain in the TB set. The TBs in the TB set transmission of which are incomplete according to a repetition number for a TB, is referred as a sixth number of remaining TBs.

Figure 1:
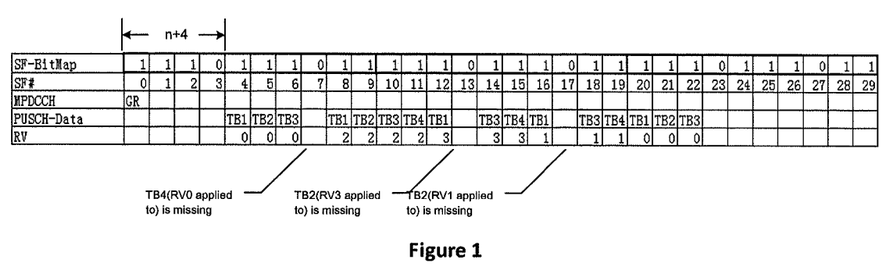
FIG. 1 is a schematic diagram illustrating transmission of multiple transport blocks in a scenario of eMTC CE mode A.

FIG. 1 is a schematic diagram illustrating the transmission of multiple transport blocks in a scenario of eMTC CE mode A. In particular, the first row in FIG. 1 indicates whether a subframe is valid subframe or invalid subframe. For example, the SF-BitMap for subframe #0 through subframe #9 is illustrated as "1 1 1 0 1 1 1 0 1 1" with a SF-BitMap period of 10 ms, wherein a value of "1" indicates the corresponding subframe is a valid subframe, while a value of "0" indicates the corresponding subframe is an invalid subframe.

The second row (SF #) in FIG. 1 indicates the indices of subframes.

The third row (MPDCCH) in FIG. 1 indicates a subframe where an uplink grant (GR) is received. As shown in FIG. 1, the uplink grant over MPDCCH is received in subframe 0 by UE. UE will perform UL transmission in a certain number of subframes, for example #n+4 subframes, subsequent to the subframe #n in which the uplink grant was received. It should be understood that, although it is shown that the duration between the subframe for PUSCH transmission and that for the uplink grant is three subframes, in FIG. 1, this is not a limitation.

The fourth row (PUSCH-Data) in FIG. 1 indicates subframes in which TBs will be sent. As shown in FIG. 1, there are a total of four TBs—TB1, TB2, TB3 and TB4, transmitted in valid subframes. That is, the number of TBs (known as $N_T$) in the TB set {TB1, TB2, TB3, TB4} is four. Further, as known to the one skilled in the relevant art, one subframe is used to transmit a single TB in the scenario of CE mode A. That is, a number of consecutive subframes for a same TB with the same RV and the same scrambling sequence (known as $N_{acc}$) is one in the scenario of CE mode A.

The fifth row (RV) in FIG. 1 indicates RV index applied to the corresponding TBs. As shown in FIG. 1, TB4, which should be transmitted in subframe 7, is missing, given that subframe 7 is an invalid subframe. That is, TB4 is missing in a first round of transmission of TB set {TB1, TB2, TB3, TB4}, which RV0 is applied to. Similar, TB2, which should be transmitted in subframe 13 and 17, is also missing, given that these two subframes are identified as invalid subframes. That is, TB2 is missing in a third and fourth round of transmission of the TB set, with RV3 and RV1 applied respectively for each round. It is obviously that both TB4 and TB2 have less repetition times than other TBs such as TB1 in the first PUSCH transmission duration of 20 subframes. In this case, both TB1 and TB3 has completed the repeated transmission (assuming that the repetition number for transmission is five for each of the transmission block) while neither TB2 nor TB4, which affects the time diversity among interleaved transmission.

In another aspect, although PUSCH transmission according to the uplink grant is shown in FIG. 1, it should be understood that it is also applicable for downlink (DL) transmission scheduling. For example, in the case that DCI indicating DL transmission scheduling is received in subframe 0, the fourth row in FIG. 1 should indicate PDSCH subframes carrying TBs.

Figure 2:
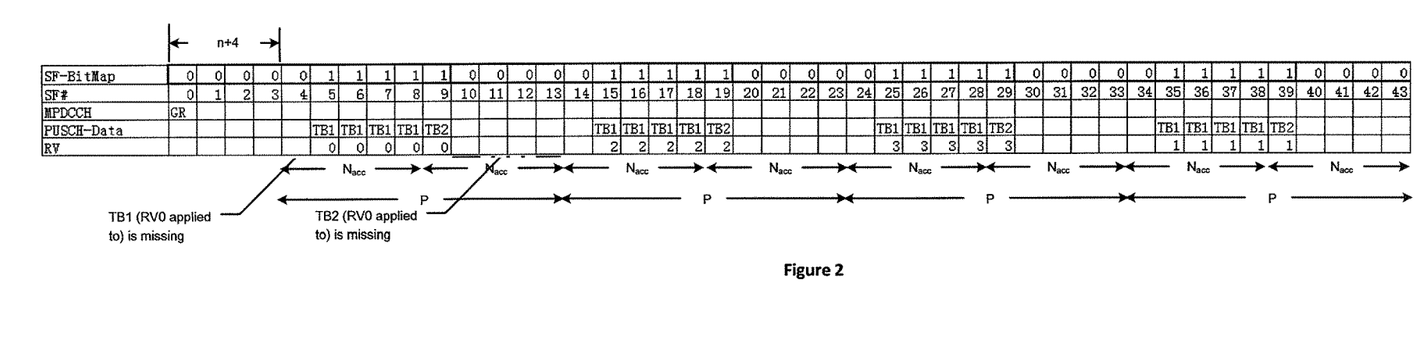
FIG. 2 is a schematic diagram illustrating transmission of multiple transport blocks in a scenario of eMTC CE mode B.

FIG. 2 is a schematic diagram illustrating transmission of multiple transport blocks in a scenario of eMTC CE mode B. The first row to the third row in FIG. 2 have similar definitions with that in FIG. 1, thereby the description thereof is omitted for the purpose of brevity. It should be noted that the SF-BitMap, for example, for subframe #0 through subframe #9, is "0 0 0 0 0 1 1 1 1 1", which implies that the subframe #0 through subframe #4 are not used to carry TBs.

The fourth row (PUSCH-Data) in FIG. 2 indicates subframes the TBs will be transmitted in. As shown in FIG. 2, there are a total of four instances of TB1 and one instance of TB2 transmitted across valid subframes. That is, the number of TBs (known as $N_T$) in the TB set {TB1, TB2} is two. Further, as known to the one skilled in the relevant art, more than one subframe is used to transmit a certain TB with the same RV index and same scrambling sequence in the scenario of CE mode B. For CE mode 13, the number of consecutive subframes for the same TB, i.e. $N_{acc}$, is set to five for TDD, which means that either TB1 or TB2 can be transmitted across five consecutive subframes in a round of transmission for the TB set.

However, as shown in FIG. 2, TB1, which should be transmitted starting with subframe 4, is missing, given that subframe 4 is an invalid subframe. Thereby only four subframes: subframe #5 through #8, carrying TB1 are used for TB1 transmission in the first round of transmission for the TB set with RV0 applied to each transmitted subframe. Similarly, TB2, which should be transmitted in subframes 10 through 13, is also missing and is not being transmitted given that these subframes are being identified as invalid subframes. Therefore, only one subframe carrying TB2 is used for TB2 transmission in the first round of transmission for the TB set {TB1, TB2} with RV0 applied for each transmitted subframe. It is obvious that TB2 has fewer repetition times than TB1 in the first round of transmission for TB set {TB1, TB2} according to the SF-BitMap. In order to improve decoding of transmitted TBs, specifically those TBs with repetition times less than other TBs, a transmission order for TBs in a TB set, as well as a determination of RV indices and scrambling sequence applied to transmitted TBs should be studied.

A First Embodiment

Figure 3A:
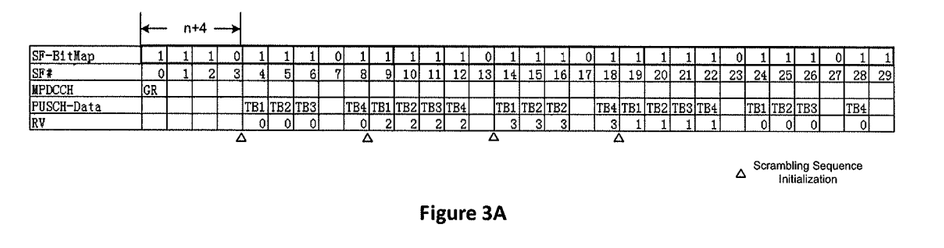
FIG. 3A is a schematic diagram illustrating scheduling multiple transport blocks according to a first embodiment of the present application.

FIG. 3A is a schematic diagram illustrating the transmission of multiple transport blocks according to a first embodiment of the present application.

As shown in FIG. 3A, the SF-BitMap for sets of illustrated subframes is identified in the first row labeled SF-BitMap. That is, the SF-BitMap, for example, for subframes #0 through #9 is "1 1 1 0 1 1 1 0 1 1". The uplink grant is received in subframe #0, which implies the initial TB should be transmitted in subframe 4, as described with regard to FIG. 1. The transmission order of multiple TBs shown in FIG. 3A is different with that of FIG. 1 since the TBs in the transmitted TB set {TB1, TB2, TB3, TB4} are cyclically transmitted only in valid subframes according to the SF-BitMap for multiple subframes. Further, the same RV index is applied to TBs in a TB set transmitted for a certain number of valid subframes. For example, TB set {TB1, TB2, TB3, TB4} is cyclically transmitted across subframes #4, #5, #6 and #8, and then similarly, transmitted across subframes #9 through #12, subframes #14, #15, #16 and #18, subframes #19 through 22, and subframes #24, #25, #26, #28, i.e. across valid subframes.

Figure 3B:
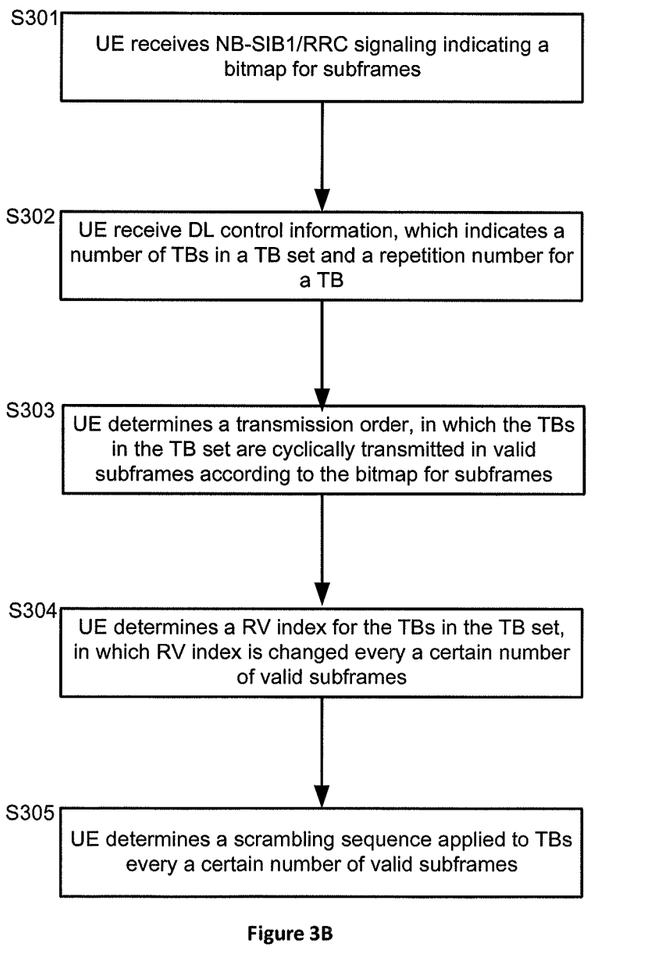
FIG. 3B is a call flow illustrating determination of transmission order, RV index applied to TBs and scrambling sequence initialization according to the first embodiment of the present application.

FIG. 3B is a call flow illustrating determination of the transmission order, RV index applied to TBs and scrambling sequence initialization according to the first embodiment of the present application illustrated in FIG. 3A.

As shown in FIG. 3B, in step S301, UE receives NB-SIB1/RRC signaling indicating a SF-BitMap to be applied. That is, the SF-BitMap of "1 1 1 0 1 1 1 0 1 1" for subframes #0 through subframe #9 with the SF-BitMap period of 10 ms illustrated in FIG. 3A is indicated/configured in NB-SIB1/RRC signaling.

In step S302, UE receive DL control information, which indicates the number of TBs in a TB set and a repetition number for a TB. The repetition number of a TB indicates the total repetition number for a same TB. For example, the repetition number of a TB is selected from a repetition number set {1, 2, 4, 8, 16, 32} for Rel.13 eMTC CE mode A. The number of TBs selected from the TB set is also known as a first number of TBs herein.

In step S303, UE determines a transmission order, in which the TBs in the TB set are cyclically transmitted in valid subframes according to the SF-BitMap for subframes. Particularly, as shown in FIG. 3A, TB4—instead of TB1—is transmitted in subframe 4. Then, TB1, TB2, TB3 and TB4 are cyclically transmitted in valid subframes until the repetition number of transmission for the TB is completed.

In step S304, UE determines a RV index for TBs in the TB set, in which the RV index is changed every a certain number of valid subframes. Expressed in another way, the RV index applied to the transmitted TB lasts for a third number of valid subframes. It is shown in FIG. 3A that the RV index is changed every four valid subframes. Particularly, in the example shown in FIG. 3A, subframes #4, #5, #6 and #8, to which RV0 is applied, are used for the first round of transmissions for the TB set {TB1, TB2, TB3, TB4}. Subframes #9, #10, #11 and #12, to which RV1 is applied, are used for the second round of transmission for the same TB set. In summary, the third number in the first embodiment equals to the number of transport blocks in the TB set, i.e., the first number of TBs.

In step S305, UE determines a scrambling sequence applied to TBs every a certain number of valid subframes. In another word, a scrambling sequence applied to at least one of the first number of TBs lasts for a fourth number of valid subframes. As shown in FIG. 3A, a triangle icon indicates a start point for scrambling sequence initialization. It is shown in FIG. 3A that a scrambling sequence is initialized every four valid subframes with the scrambling sequence initialized in subframe #4, which is the first subframe for the first round of transmission for the TB set. Then the scrambling sequence is initialized in subframe #9, which is the first subframe for the second round of transmission for the TB set. In summary, the fourth number in the first embodiment equals to the number of transport blocks in the TB set, i.e., the first number of TBs.

A Second Embodiment

Figure 4A:
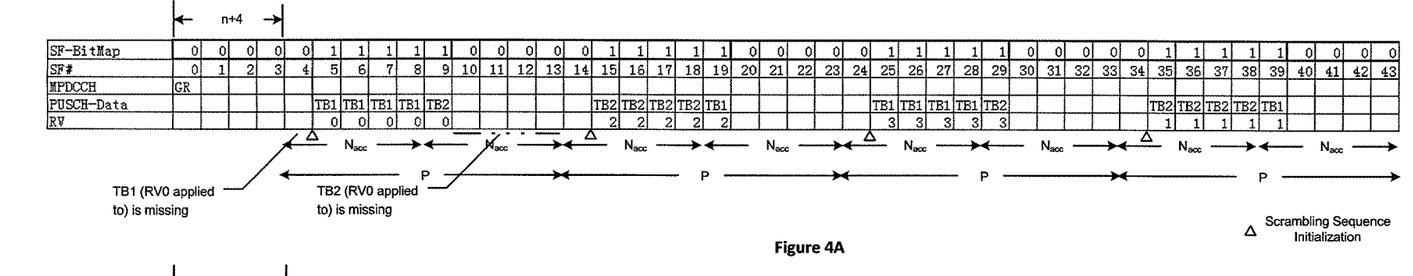
FIG. 4A is a schematic diagram illustrating transmission of multiple transport blocks according to a second embodiment of the present application.

FIG. 4A is a schematic diagram illustrating transmission of multiple transport blocks according to a second embodiment of the present application.

As shown in FIG. 4A, the SF-BitMap for sets of illustrated subframes is identified in the first row labeled as SF-BitMap. That is, the SF-BitMap for subframes is "0 0 0 0 0 1 1 1 1 1" for subframe #0 to subframe #9. The uplink grant is received in subframe #0, which implies the initial TB should be transmitted in subframe #4. However, subframe #4 is an invalid subframe, thereby the initial TB is transmitted in subframe #5 through subframe #8 as valid subframes. The transmission order of multiple TBs shown in FIG. 4A is different with that of FIG. 2, since the TBs in the TB set are cyclically transmitted with the transmission order of {TB1, TB2} in the period of 10 ms, subframe #4 to subframe #13, while the TBs in the TB set are cyclically transmitted with the transmission order of {TB2, TB1} in the period of 10 ms, subframe #14 through subframe #23. That is, a first TB in the period is cyclically selected from the TB set. Further, the same RV index applied to TBs lasts for a certain number of absolute subframes.

Figure 4B:
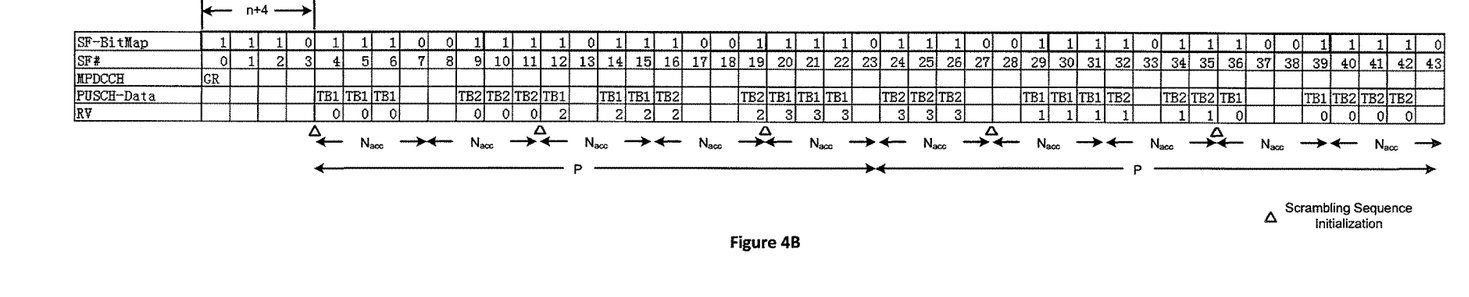
FIG. 4B is another schematic diagram illustrating transmission of multiple transport blocks according to the second embodiment of the present application.

FIG. 4B is another schematic diagram illustrating transmission of multiple transport blocks according to the second embodiment of the present application.

As shown in FIG. 4B, the SF-BitMap for sets of illustrated subframes is identified with a bold box in the first row labeled SF-BitMap. That is, the SF-BitMap for subframes is "1 1 1 0 1 1 1 0 0 1". The uplink grant is received in subframe #0 and further subframe #4 is a valid subframe, thereby the initial TB is transmitted in subframe #4. The transmission order of multiple TBs shown in FIG. 4A indicates that, the TBs in the TB set are cyclically transmitted with the transmission order of {TB1, TB2, TB1, TB2, TB1} in the period of 20 ms, subframe #4 to subframe #23, while the TBs in the TB set are cyclically transmitted with the transmission order of {TB2, TB1, TB2, TB1, TB2} in the period of 20 ms, subframe #24 through subframe #43. That is, the first TB in the period is cyclically selected from the TB set. In the first period of 20 ms, the first TB is TB1 and the second period of 20 ms, the first TB is TB2. Further, the same RV index applied to TBs lasts for a certain number of absolute subframes.

Figure 4C:
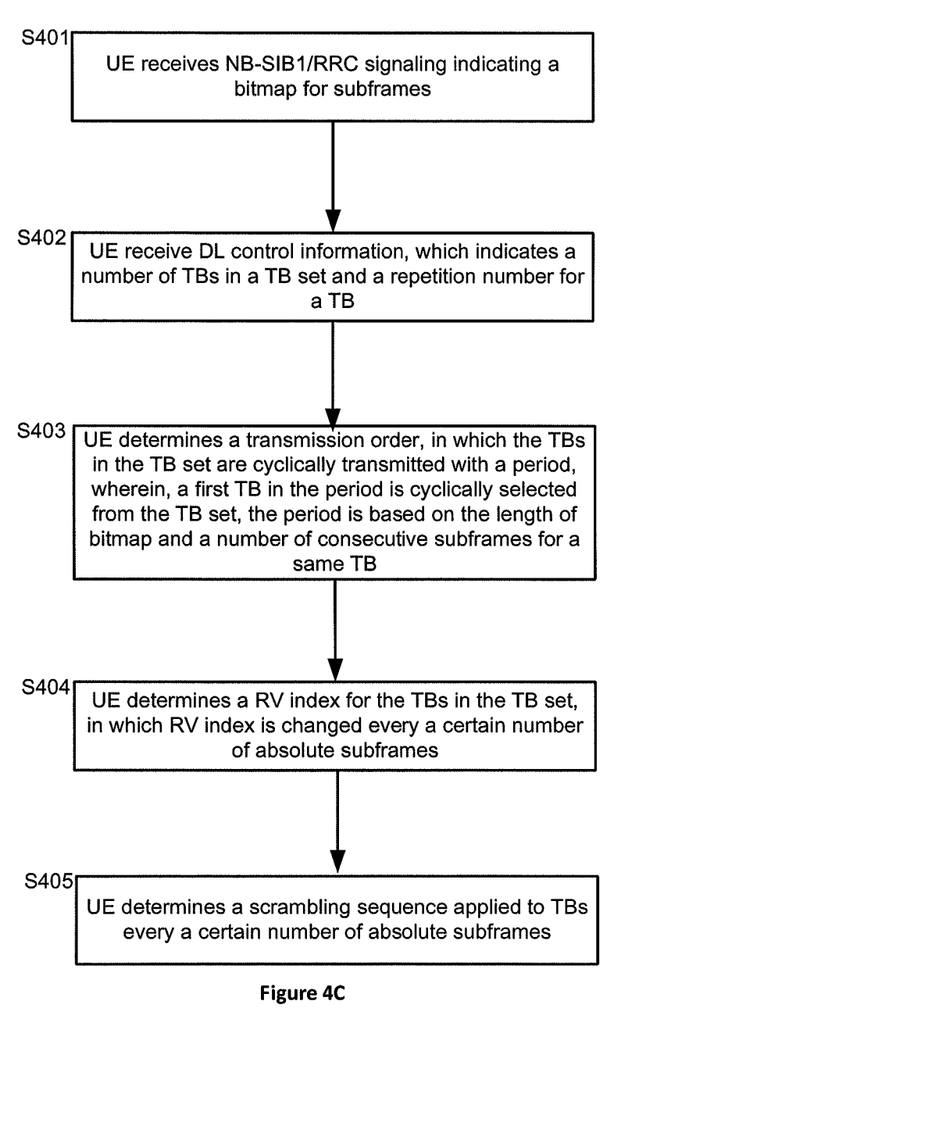
FIG. 4C is a call flow illustrating determination of transmission order, RV index applied to TBs and scrambling sequence initialization according to the second embodiment of the present application.

FIG. 4C is a call flow illustrating determination of transmission order, RV index applied to TBs and scrambling sequence initialization according to the second embodiment of the present application illustrated in FIGS. 4A and 4B.

As shown in FIG. 4C, in step S401, UE receives NB-SIB1/RRC signaling indicating a SF-BitMap to be applied. That is, the SF-BitMap "0 0 0 0 0 1 1 1 1 1" for subframes with the period of 10 ms illustrated in FIG. 4A or the SF-BitMap "1 1 1 0 1 1 1 0 0 1" for subframes with the period of 10 ms illustrated in FIG. 4B, is indicated/configured in NB-SIB1/RRC signaling.

In step S402, UE receives DL control information, which indicates the number of TBs in a TB set and a repetition number for a TB. The number of TBs in a TB set is also known as a first number of TBs herein. For example, in the scenario of eMTC CE mode B, the number of TBs in a TB set {TB1, TB2} is two. The repetition number of a TB indicates the total repetition number for a same TB. For example, the repetition number of a TB is selected from a repetition number set {1, 2, 4, 8, 16, 32} for Rel.13 eMTC CE mode A.

In step S403, UE determines a transmission order, in which the TBs in the TB set are cyclically transmitted with a period, wherein the first TB in the period is cyclically selected from the TB set, the period is determined by the length of the SF-BitMap and a number of consecutive subframes for a same TB. For example, in the case of the length of the SF-BitMap being 10 ms and the number of consecutive subframe for a TB being 5 ms for eMTC CE mode B in TDD, the period is 10 ms. Particularly, as shown in FIG. 4A, the first period is from subframe 4 to subframe 13. Similarly, the second period is from subframe 14 to subframe 23, that is, the period spans 10 subframes. The first TB in the first period is TB1, while the first TB in the second period is TB2. Thereby TB1 is repeatedly transmitted four times and TB2 is transmitted once in the first period. However TB1 is transmitted once and TB2 is repeatedly transmitted four times in the second period. That is, both TB1 and TB2 have equivalent transmission opportunities according to the second embodiment.

In another example shown in FIG. 4B, in which the length of the SF-BitMap is 10 ms and the number of consecutive subframe for a TB is 4 ms for eMTC CE mode B in FDD, the period is 20 ms. the first period is from subframe 4 to subframe 23. Similarly, the second period is from subframe 24 to subframe 43, that is, the period spans 20 subframes. The first TB in the first period is TB1, while the first TB in the second period is TB2. Therefore TB1 is repeatedly transmitted nine times and TB2 is repeatedly transmitted five times in the first period, however TB1 is repeatedly transmitted five times and TB2 is repeatedly transmitted nine times in the second period. That is, both TB1 and TB2 have equivalent transmission opportunities according to the second embodiment.

In summary, the period is a least common multiple of the length of the SF-BitMap (known as "subframe bitmap period") and the number of consecutive subframes for a same TB (known as "$N_{acc}$" or a fifth number of consecutive subframes for a same TB).

In the example shown in FIG. 4A, given that the length of SF-BitMap is (subframe bitmap period spans) 10 subframes and the (fifth) number of consecutive subframes for a same TB is 5 ($N_{acc}$=5) for eMTC CE mode B in TDD, the period spans 10 subframes, which is the least common multiple of 10 and 5. In another example shown in FIG. 4B, given that the length of the SF-BitMap (subframe bitmap period spans) is 10 subframes and the (fifth) number of consecutive subframes for a same TB is 4 ($N_{acc}$=4) for eMTC CE mode B in FDD, the period spans 20 subframes, which is the least common multiple of 10 and 4.

It is known herein that the period spans a second number of subframes. The second number of subframes is determined by at least one of a subframe bitmap period, the first number of TBs and a fifth number of consecutive subframes for a same TB.

In step S404, UE determines an RV index for the TBs in the TB set, in which the RV index is changed every a certain number of absolute subframes. Expressed in another way, the RV index applied to at least one of the first number of TBs lasts for a third number of absolute subframes. In the example shown in FIG. 4A, the RV index is changed every ten absolute subframes. In the example shown in FIG. 4B, the RV index is changed every eight absolute subframes. Particularly, in the example shown in FIG. 4A, subframes #4 through #8, to which RV0 is applied, are used for the transmission of TB1 in the TB set. Subframes #9 through #13, to which RV0 is also applied, are used for the transmission of TB2 in the TB set. In another example shown in FIG. 4B, subframes #4 through #7, to which RV0 is applied, are used for the transmission of TB1 in the TB set. Subframes #8 through #11, to which RV0 is also applied, are used for the transmission of TB2 in the TB set. In summary, the third number in the second embodiment is determined according to the number of transport blocks in the TB set (the first number of TBs) and the (fifth) number of consecutive subframes for a same TB. As the (fifth) number of consecutive subframes for a same TB is associated with a duplex mode and a coverage mode, it should be understood that the third number is determined by at least one of a duplex mode, a coverage mode and the first number of transport blocks.

In step S405, UE determines scrambling sequence applied to TBs every a certain number of absolute subframes. In another word, the scrambling sequence applied to at least one of the first number of TBs lasts for a fourth number of absolute subframe. As shown in FIG. 4A or 4B, a triangle icon indicates the start point of scrambling sequence initialization. In the example shown in FIG. 4A, the scrambling sequence is initialized every ten absolute subframes. Similarly, in the example shown in FIG. 4B, the scrambling sequence is initialized every eight absolute subframes. In another aspect, in the example shown in FIG. 4A, the scrambling sequence is initialized in subframe #5 and #15 which are the first subframe of the first and second period, respectively. In another example shown in FIG. 4B, the scrambling sequence is initialized in subframes #4 and #12, which are the first subframes of the first and second period, respectively. In summary, the fourth number in the second embodiment is determined according to the number of transport blocks in the TB set (the first number of TBs) and the (fifth) number of consecutive subframes for a same TB. As the (fifth) number of consecutive subframes for a same TB is associated with a duplex mode and a coverage mode, it should be understood that the fourth number is determined by at least one of a duplex mode, a coverage mode and the first number of transport blocks.

A Third Embodiment

Figure 5A:
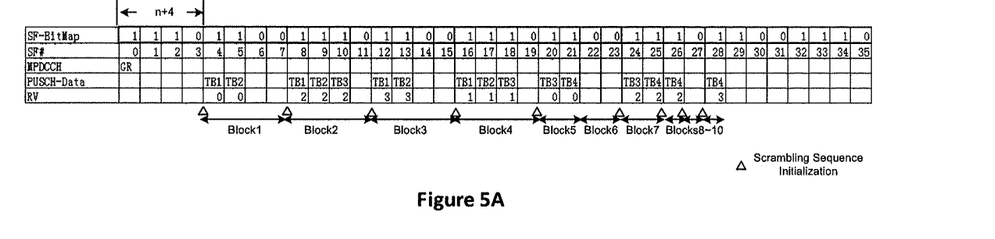
FIG. 5A is a schematic diagram illustrating transmission of multiple transport blocks according to a third embodiment of the present application.

FIG. 5A is a schematic diagram illustrating transmission of multiple transport blocks according to a third embodiment of the present application.

As shown in FIG. 5A, the SF-BitMap for sets of illustrated subframes is identified with a bold box in the first row labeled SF-BitMap. That is, the SF-BitMap for subframes is "1 1 1 0 1 1 0 0" with the period of 10 ms. The uplink grant is received in subframe #0 and further subframe #4 is a valid subframe, thereby the initial TB is transmitted in subframe #4. The transmission order of multiple TBs shown in FIG. 5A is different with that of FIG. 1, since the TBs in the transmitted TB set {TB1, TB2, TB3, TB4} are cyclically transmitted with the time block. Wherein duration of the time block is based on the number of consecutive subframes for a same TB ($N_{acc}$) and the number of remaining TBs in the TB set, transmission of which is incomplete according to the repetition number for a TB. For example, assuming the repetition number for a TB is four, TB1 and TB2 are transmitted in the Block 1 from subframes #4 through #7 with the duration of four subframes, TB1, TB2 and TB3 are transmitted in the Block 2 from subframes #8 through #11 with the duration of four subframes, TB1 and TB2 are transmitted in the Block 3 from subframes #12 through #15 with the duration of four subframes, and TB1, TB2 and TB3 are transmitted in the Block 4 from subframes #16 through #19 with the duration of four subframes, thereby the transmission of both TB1 and TB2 has been completed. Further, TB3 and TB4 are transmitted in the Block 5 from subframes #20 and #21 with the duration of two subframes, and TB3 and TB4 are transmitted in the Block 7 from subframes #24 and #25 with the duration of two subframes, thereby the transmission of TB3 has been completed. Further, TB4 is transmitted in the Block 8 in subframe #26 with the duration of one subframe, and TB4 is transmitted in the Block 10 in subframe #28 with the duration of one subframe, thereby the transmission of TB4 has been completed, and the transmission of the TB set {TB1, TB2, TB3, TB4} are completed. Further, the same RV index applied to TBs lasts for a certain number of absolute subframes.

Figure 5B:
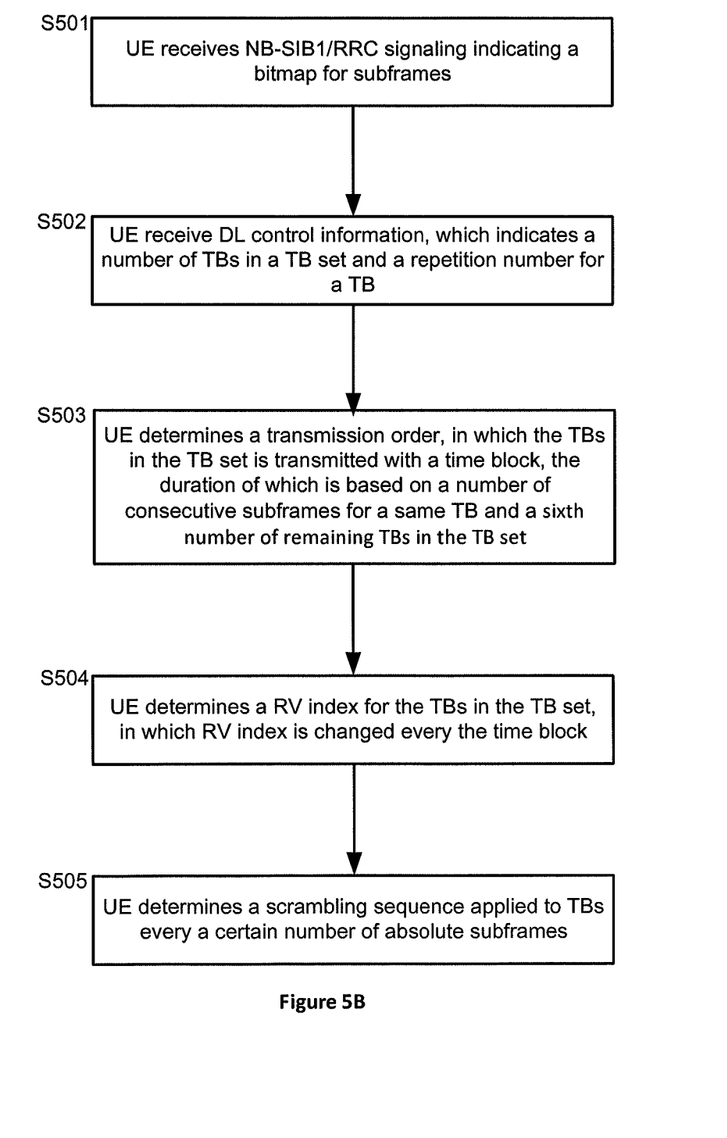
FIG. 5B is a call flow illustrating determination of transmission order, RV index applied to TBs and scrambling sequence initialization according to the third embodiment of the present application.

FIG. 5B is a call flow illustrating determination of transmission order, the RV index applied to TBs, and scrambling sequence initialization according to the third embodiment of the present application illustrated in FIG. 5A.

As shown in FIG. 5B, in step S501, UE receives NB-SIB1/RRC signaling indicating a SF-BitMap to be applied. That is, the SF-BitMap "1 1 1 0 1 1 0 0" for subframes #0 through #7 illustrated in FIG. 5A is transmitted in NB-SIB1/RRC signaling.

In step S502, UE receives DL control information, which indicates a number of TBs in a TB set and a repetition number for a TB. The repetition number of a TB indicates the total repetition number for a same TB. For example, the repetition number of a TB is selected from a repetition number set {1, 2, 4, 8, 16, 32} for Rel.13 eMTC CE mode A. The number of TBs in a TB set is also known as a first number of TBs herein.

In step S503, UE determines a transmission order, in which the TBs in the TB set are transmitted with a time block, the duration of which is based on a (fifth) number of consecutive subframes for a same TB and a sixth number of remaining TBs in the TB set. Particularly, as shown in FIG. 6A, the first, second, third and fourth time block (blocks 1-4) lasts for four subframes given that the transmission of four TBs in the TB set has not been completed. However, the fifth, sixth and seventh time block (blocks 5-7) lasts for two subframes, given that the transmission of two TBs in the TB set, i.e., TB3 and TB4, has not been completed. Further, the eighth, ninth and tenth time blocks (blocks 8-10) lasts for one subframe, given that the transmission of one TB in the TB set, i.e., TB4, has not been completed. It is known herein that the sixth number of remaining TBs refers to the TBs in the TB set transmission of which is incomplete according to a repetition number for a TB. Because the (fifth) number of consecutive subframes for a same TB is 1 in the scenario of CE mode A, the duration of the time block is determined by the sixth number of remaining TBs in the TB set. However, it should be understood that in the scenario of CE mode B in which the number of consecutive subframes for a same TB is more than 1 (e.g. $N_{acc}$=5 or 10), the duration of the time block is enlarged and based on a (fifth) number of consecutive subframes for a same TB and the sixth number of remaining TBs in the TB set.

In step S504, UE determines an RV index for the TBs in the TB set, in which RV index is changed every a certain number of absolute subframes. Expressed in another word, the RV index applied to the transmitted TBs lasts for a third number of absolute subframes. It is shown in FIG. 5A that the RV index is changed every a certain number of absolute subframes, which is based on the duration of the time block. Particularly, in the example shown in FIG. 5A, subframes #4 through #7, to which RV0 is applied, are used for the transmission of TBs in block1. Subframes #8 through #11, to which RV1 is applied, are used for the transmission of TBs in block2, and so on. In summary, the third number in the third embodiment is determined according to the number of remaining transport blocks in the TB set and the (fifth) number of consecutive subframes for a same TB. Because the (fifth) number of consecutive subframes for a same TB is associated with a duplex mode and a coverage mode, and the number of remaining transport blocks in the TB set is associated with the (first) number of remaining transport blocks, it should be understood that the third number is determined by at least one of a duplex mode, a coverage mode and the first number of transport blocks.

In step S505, UE determines scrambling sequence initialization every a certain number of absolute subframes. In another word, the scrambling sequence applied to at least one of the first number of TBs lasts for a fourth number of absolute subframe. As shown in FIG. 5A, a triangle icon indicates a start point for scrambling sequence initialization. It is shown in FIG. 5A that the scrambling sequence is initialized every a certain number of absolute subframes, which is based on the duration of the time block. In the example shown in FIG. 5A, the scrambling sequence is initialized in subframes 4, 8, 16, 20, 24, 26, 27 and 28, which are the first subframes of the time blocks. In summary, the fourth number in the third embodiment is determined according to the number of remaining transport blocks in the TB set and the (fifth) number of consecutive subframes for a same TB. Because the (fifth) number of consecutive subframes for a same TB is associated with a duplex mode and a coverage mode, and the number of remaining transport blocks in the TB set is associated with the (first) number of remaining transport blocks, it should be understood that the fourth number is determined by at least one of a duplex mode, a coverage mode and the first number of transport blocks.

It should be understood that although PUSCH transmission is used as an example for illustrating the transmission of multiple TBs according to the embodiments of the present application, the present application is not limited to so. In one example, transmission of multiple TBs according to the embodiments of the present application can also be applicable for PDSCH transmission. Particularly, UE expects the PDSCH transmission of multiple TBs according to the embodiment of the present application in the case that a DL grant is received in a DCI format. In another aspect, it should be understood by the one skilled in the relevant art that the embodiments of the present application can also be applicable to network equipment. In one example, network equipment such as gNB, can expect the reception of multiple TBs according to the embodiment of the present application after the UL grant is sent to UE. In another example, network equipment such as gNB, can send multiple TBs according to the embodiment of the present application after the DL grant is sent to UE.

One skilled in the relevant art will recognize that the process described in FIGS. 2-5 does not need to be practiced in the sequence shown in the Figures and may be practiced without one or more of the specific steps or with other steps not shown in the Figures.

Determination of RV

For BL/CE UEs, the same redundancy version for $N_T$ transport block is applied to PDSCH transmitted in a given block of $N_T \times N_{acc}$ consecutive subframes, if the PDSCH is not carrying SystemInformationBlockType1-BR or SI message. The subframe number of the first subframe in each block of $N_T \times N_{acc}$ consecutive subframes, denoted as $n_{abs,1}$, satisfies $(n_{abs,1} - \delta) \mod (N_T \times N_{acc})$, where $\delta = 0$ for FDD and $\delta = 2$ for TDD. Denote $i_0$ as the subframe number of the first downlink subframe intended for PDSCH and $N_T$ as the (first) number of TBs in the TB set as described above indicated by a control signal. The PDSCH transmission for $N_T$ transport blocks spans $N_{abs}^{PDSCH}$ consecutive subframes including non-BL/CE subframes where the PDSCH transmission is postponed. Note that BL/CE subframe(s) refers to either BL/CE DL subframe(s) or BL/CE UL subframe(s). For the $j^{th}$ block of $N_T \times N_{acc}$ consecutive subframes within the set of $N_{abs}^{PDSCH}$ subframes, the redundancy version ($rv_{idx}$) is determined according to the following Table 1 using $rv = (j + rv_{DCI}) \mod 4$, where $j = 0, 1, \ldots, J^{PDSCH} - 1$, and $$J^{PDSCH} = \left\lceil \frac{N_{abs}^{PDSCH} + ((i_0 - \delta) \mod (N_{acc} \times N_T))}{N_T \times N_{acc}} \right\rceil.$$

The $J^{PDSCH}$ blocks of subframes are sequential in time, starting with $j=0$ to which subframe $i_0$ belongs. For a BL/CE UE configured in CE Mode A, $N_{acc} = 1$ and $rv_{DCI}$ is determined by the 'Redundancy version' field in DCI format 6-1A. For a BL/CE UE configured with CE Mode B, or a BL/CE UE receiving PDSCH associated with P-RNTI, $N_{acc} = 4$ for FDD and $N_{acc} = 10$ for TDD, and $rv_{DCI} = 0$.

TABLE 1

| Redundancy version | |
|---|---|
| Redundancy version Index rv | $rv_{idx}$ |
| 0 | 0 |
| 1 | 2 |
| 2 | 3 |
| 3 | 1 |

For BL/CE UEs, the same redundancy version is applied to PUSCH transmitted in a given block of $N_T \times N_{acc}$ consecutive subframes. The subframe number of the first subframe in each block of $N_T \times N_{acc}$ consecutive subframes, denoted as $n_{abs,1}$ satisfies $(n_{abs,1} - \delta) \mod (N_T \times N_{acc})$. Denote $i_0$ as the subframe number of the first uplink subframe intended for PUSCH and Denote $N_T$ as the (first) number of TBs in the TB set as described above indicated by a control signal. The PUSCH transmission spans $N_{abs}^{PUSCH}$ consecutive subframes including non-BL/CE subframes where the PUSCH transmission is postponed. For the $j^{th}$ block of $N_T \times N_{acc}$ consecutive subframes within the set of $N_{abs}^{PUSCH}$ subframes, the redundancy version ($rv_{idx}$) is determined according to Table 1 using $rv = (j + rv_{DCI}) \mod 4$, where $j = 0, 1, \ldots, J^{PUSCH} - 1$, and $$J^{PUSCH} = \left\lceil \frac{N_{abs}^{PUSCH} + ((i_0 - \delta) \mod (N_{acc} \times N_T))}{N_{acc} \times N_T} \right\rceil.$$

The $J^{PUSCH}$ blocks of subframes are sequential in time, starting with $j=0$, to which subframe $i_0$ belongs. For a BL/CE UE configured in CE Mode A, $N_{acc} = 1$ and $rv_{DCI}$ is determined by the 'Redundancy version' field in DCI format 6-0A. For a BL/CE UE configured with CE Mode B, $N_{aec} = 4$ for FDD and $N_{acc} = 5$ for TDD, and $rv_{DCI} = 0$.

Figure 6:
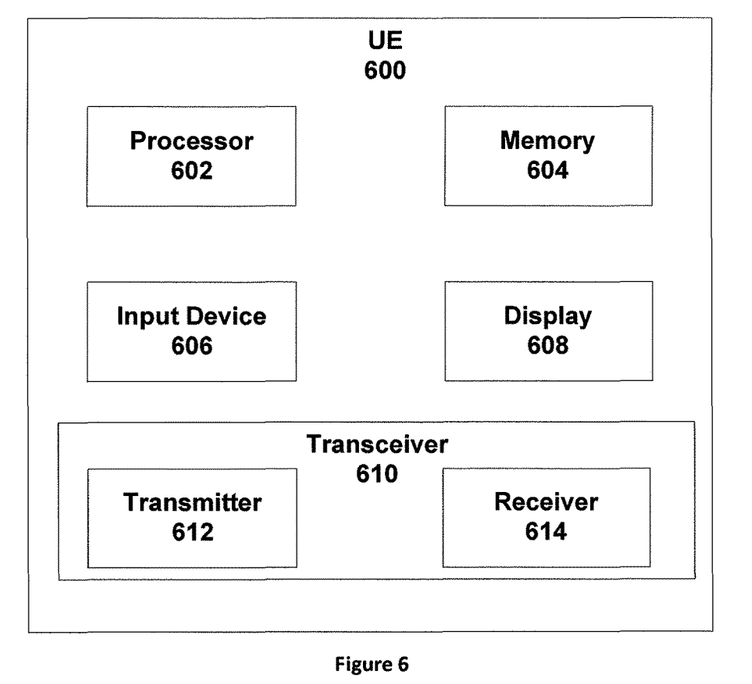
FIG. 6 is a schematic block diagram illustrating components of a UE such as UE according to one embodiment.

FIG. 6 is a schematic block diagram illustrating components of a UE such as BL/CE UEs according to one embodiment.

UE 600 is an embodiment of the UE described from FIG. 1 to FIG. 5B. Furthermore, UE 600 may include a processor 602, a memory 604, and a transceiver 610. In some embodiments, UE 600 may include an input device 606 and/or a display 608. In certain embodiments, the input device 606 and the display 608 may be combined into a single device, such as a touch screen.

The processor 602, in one embodiment, may include any known controller capable of executing computer-readable instructions and/or capable of performing logical operations. For example, the processor 602 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 602 executes instructions stored in the memory 604 to perform the methods and routines described herein. The processor 602 is communicatively coupled to the memory 604, the input device 606, the display 608, and the transceiver 610.

In some embodiments, the processor 602 controls the transceiver 610 to receive various configuration and data from Network Equipment 700. In certain embodiments, the processor 602 may monitor DL signals received via the transceiver 610 for specific messages.

The memory 604, in one embodiment, is a computer readable storage medium. In some embodiments, the memory 604 includes volatile computer storage media. For example, the memory 604 may include a RAM, including dynamic RAM ("DRAM"), synchronous dynamic RAM ("SDRAM"), and/or static RAM ("SRAM"). In some embodiments, the memory 604 includes non-volatile computer storage media. For example, the memory 604 may include a hard disk drive, a flash memory, or any other suitable non-volatile computer storage device. In some embodiments, the memory 604 includes both volatile and non-volatile computer storage media. In some embodiments, the memory 604 stores data relating to trigger conditions for transmitting the measurement report to Network Equipment 700. In some embodiments, the memory 604 also stores program code and related data, such as an operating system or other controller algorithms operating on UE 600.

UE 600 may optionally include an input device 606. The input device 606, in one embodiment, may include any known computer input device including a touch panel, a button, a keyboard, a stylus, a microphone, or the like. In some embodiments, the input device 606 may be integrated with the display 608, for example, as a touch screen or similar touch-sensitive display. In some embodiments, the input device 606 includes a touch screen such that text may be input using a virtual keyboard displayed on the touch screen and/or by handwriting on the touch screen. In some embodiments, the input device 606 includes two or more different devices, such as a keyboard and a touch panel. In certain embodiments, the input device 606 may include one or more sensors for monitoring an environment of UE 600.

UE 600 may optionally include a display 608. The display 608, in one embodiment, may include any known electronically controllable display or display device. The display 608 may be designed to output visual, audible, and/or haptic signals. In some embodiments, the display 608 includes an electronic display capable of outputting visual data to a user. For example, the display 608 may include, but is not limited to, an LCD display, an LED display, an OLED display, a projector, or a similar display device capable of outputting images, text, or the like to a user. As another, non-limiting, example, the display 608 may include a wearable display such as a smart watch, smart glasses, a heads-up display, or the like. Further, the display 608 may be a component of a smart phone, a personal digital assistant, a television, a table computer, a notebook (laptop) computer, a personal computer, a vehicle dashboard, or the like.

In certain embodiments, the display 608 may include one or more speakers for producing sound. For example, the display 608 may produce an audible alert or notification (e.g., a beep or chime). In some embodiments, the display 608 includes one or more haptic devices for producing vibrations, motion, or other haptic feedback. In some embodiments, all or portions of the display 608 may be integrated with the input device 606. For example, the input device 606 and display 608 may form a touch screen or similar touch-sensitive display. In other embodiments, the display 608 may be located near the input device 606.

The transceiver 610, in one embodiment, is configured to communicate wirelessly with Network Equipment 700. In certain embodiments, the transceiver 610 comprises a transmitter 612 and a receiver 614. The transmitter 612 is used to transmit UL communication signals to Network Equipment 700 and the receiver 614 is used to receive DL communication signals from Network Equipment 900. For example, the transmitter 612 may transmit a HARQ-ACK including feedbacks for one or more DL transmissions. As another example, the receiver 614 may receive various configurations/data from Network Equipment 700.

The transmitter 612 and the receiver 614 may be any suitable types of transmitters and receivers. Although only one transmitter 612 and one receiver 614 are illustrated, the transceiver 610 may have any suitable number of transmitters 612 and receivers 614. For example, in some embodiments, UE 600 includes a plurality of transmitter 612 and receiver 614 pairs for communicating on a plurality of wireless networks and/or radio frequency bands, each transmitter 612 and receiver 614 pair configured to communicate on a different wireless network and/or radio frequency band than the other transmitter 612 and receiver 614 pairs.

Figure 7:
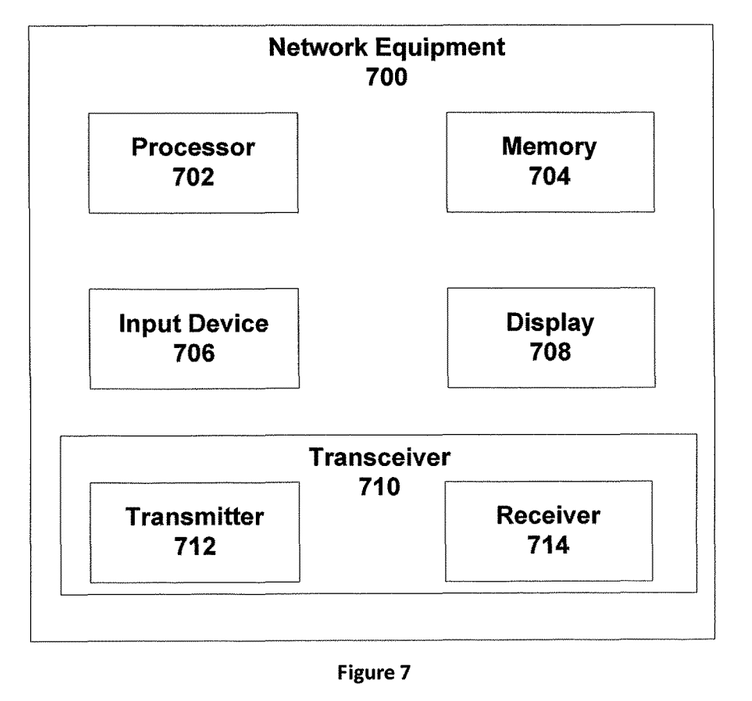
FIG. 7 is a schematic block diagram illustrating components of a network equipment according to one embodiment.

FIG. 7 is a schematic block diagram illustrating components of a network equipment according to one embodiment.

Network Equipment 700 includes one embodiment of eNB/gNB described from FIG. 2 to FIG. 4. Furthermore, Network Equipment 700 may include a processor 702, a memory 704, an input device 706, a display 708, and a transceiver 710. As may be appreciated, the processor 702, the memory 704, the input device 706, and the display 708 may be substantially similar to the processor 702, the memory 704, the input device 706, and the display 708 of UE 600, respectively.

In some embodiments, the processor 702 controls the transceiver 710 to transmit DL signals/data to UE 600. The processor 702 may also control the transceiver 710 to receive UL signals/data from UE 600. For example, the processor 702 may control the transceiver 710 to receive a HARQ-ACK including feedbacks for one or more DL transmissions. In another example, the processor 702 may control the transceiver 710 to transmit a DL signals for various configurations to UE 800, as described above.

The transceiver 710, in one embodiment, is configured to communicate wirelessly with UE 600. In certain embodiments, the transceiver 710 comprises a transmitter 712 and a receiver 714. The transmitter 712 is used to transmit DL communication signals to UE 600 and the receiver 714 is used to receive UL communication signals from UE 600. For example, the receivers 714 may receive a HARQ-ACK codebook from UE 600. As another example, the transmitter 712 may transmit the various configurations/data of Network Equipment 700.

The transceiver 710 may communicate simultaneously with a plurality of UE 600. For example, the transmitter 712 may transmit DL communication signals to UE 600. As another example, the receiver 714 may simultaneously receive UL communication signals from UE 600. The transmitter 712 and the receiver 714 may be any suitable types of transmitters and receivers. Although only one transmitter 712 and one receiver 714 are illustrated, the transceiver 710 may have any suitable number of transmitters 712 and receivers 714. For example, Network Equipment 700 may serve multiple cells and/or cell sectors, wherein the transceiver 710 includes a transmitter 712 and a receiver 714 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a control signal that indicates a plurality of different transport blocks (TBs) in a TB set and a repetition number of each different TB in the TB set;
   determining a transmission order of TBs in the TB set, wherein the transmission order corresponds to a TB index of a plurality of TB indexes corresponding to each TB in the TB set, and the plurality of TB indexes are ordered in an increasing order; and
   performing at least one of transmitting the plurality of different TBs of the TB set or receiving the plurality of different TBs of the TB set according to the transmission order in a time duration cyclically,
      wherein a first TB of the TB set is at least one of transmitted or received in a first number of subframes;
      wherein the first number of subframes comprise valid subframes;
      wherein each remaining TB of the plurality of different TBs of the TB set is transmitted or received according to the transmission order in a second number of subframes; and
      wherein a quantity of the first number of subframes is equal to a quantity of the second number of subframes and determined based at least in part on at least one of a fixed value or the repetition number corresponding to the first TB in the received control signal.

2. The method of claim 1, wherein the time duration is determined by the first number of subframes and a number of TBs in the TB set.

3. The method of claim 1, wherein the repetition number is selected from a repetition number set.

4. The method of claim 1, wherein the plurality of different TBs in the TB set comprises a remaining plurality of TBs in the TB set.

5. The method of claim 1, further comprising determining a revision version for each TB in the TB set.

6. The method of claim 5, wherein the same revision version is applied to a computed number of subframes.

7. The method of claim 6, wherein the computed number of subframes is determined based on the time duration.

8. The method of claim 1, further comprising determining a scrambling sequence for TBs of the TB set.

9. A user equipment (UE), comprising:
   at least one memory; and
   at least one processor coupled with the at least one memory and configured to cause the UE to:
      receive a control signal that indicates a plurality of different transport blocks (TBs) in a TB set and a repetition number of each different TB in the TB set;
      determine a transmission order of TBs in the TB set, wherein the transmission order corresponds to a TB index of a plurality of TB indexes corresponding to each TB in the TB set, and the plurality of TB indexes are ordered in an increasing order; and
      perform at least one of transmitting the plurality of different TBs of the TB set or receiving the plurality of different TBs of the TB set according to the transmission order in a time duration cyclically,
         wherein a first TB of the TB set is at least one of transmitted or received in a first number of subframes;
         wherein the first number of subframes comprise valid subframes;
         wherein each remaining TB of the plurality of different TBs of the TB set is received according to the transmission order in a second number of subframes; and
         wherein a quantity of the first number of subframes is equal to a quantity of the second number of subframes and determined based at least in part on at least one of a fixed value or the repetition number corresponding to the first TB in the received control signal.

10. The UE of claim 9, wherein the time duration is determined by the first number of subframes and a number of TBs in the TB set.

11. The UE of claim 9, wherein the repetition number is selected from a repetition number set.

12. The UE of claim 9, wherein the plurality of different transport blocks in the TB set comprises a remaining number of TBs in the TB set.

13. The UE of claim 9, wherein the at least one processor is configured to cause the UE to determine a revision version for each TB in the TB set.

14. The UE of claim 13, wherein the same revision version is applied to a computed number of subframes.

15. The UE of claim 14, wherein the computed number of subframes is determined based on the time duration.

16. The UE of claim 9, wherein the at least one processor is configured to cause the UE to determine a scrambling sequence for TBs of the TB set.

17. A method performed by a base station, the method comprising:
   transmitting a control signal that indicates a plurality of different transport blocks (TBs) in a TB set and a repetition number of each different TB in the TB set, wherein a transmission order of TBs in the TB set corresponds to a TB index of a plurality of TB indexes corresponding to each TB in the TB set, and the plurality of TB indexes are ordered in an increasing order; and
   performing at least one of transmitting the plurality of different TBs of the TB set or receiving the plurality of different TBs of the TB set according to the transmission order in a time duration cyclically,
      wherein a first TB of the TB set is at least one of transmitted or received in a first number of subframes;

wherein the first number of subframes comprise valid subframes;

wherein each remaining TB of the plurality of different TBs of the TB set is transmitted or received according to the transmission order in a second number of subframes; and wherein a quantity of the first number of subframes is equal to a quantity of the second number of subframes, and wherein the quantity of the first number of subframes is based at least in part on at least one of a fixed value or the repetition number corresponding to the first TB in the transmitted control signal.

18. A base station, comprising:

at least one memory; and at least one processor coupled with the at least one memory and configured to cause the base station to:

transmit a control signal that indicates a plurality of different transport blocks (TBs) in a TB set and a repetition number of each different TB in the TB set, wherein a transmission order of TBs in the TB set corresponds to a TB index of a plurality of TB indexes corresponding to each TB in the TB set, and the plurality of TB indexes are ordered in an increasing order; and perform at least one of transmitting the plurality of different TBs of the TB set or receiving the plurality of different TBs of the TB set according to the transmission order in a time duration cyclically, wherein a first TB of the TB set is at least one of transmitted or received in a first number of subframes;

wherein the first number of subframes comprise valid subframes;

wherein each remaining TB of the plurality of different TBs of the TB set is transmitted or received according to the transmission order in a second number of subframes; and wherein a quantity of the first number of subframes is equal to a quantity of the second number of subframes, and wherein the quantity of the first number of subframes is based at least in part on at least one of a fixed value or the repetition number corresponding to the first TB in the transmitted control signal.

* * * * *